(12) United States Patent
Duck

(10) Patent No.: US 6,175,673 B1
(45) Date of Patent: Jan. 16, 2001

(54) LENSED SLEEVE

(75) Inventor: Gary S. Duck, Nepean (CA)

(73) Assignee: JDS Fitel Inc., Nepean (CA)

( * ) Notice: Under 35 U.S.C. 154(b), the term of this patent shall be extended for 0 days.

(21) Appl. No.: 09/181,998

(22) Filed: Oct. 29, 1998

(51) Int. Cl.$^7$ .................................................. G02B 6/32
(52) U.S. Cl. ............................... 385/34; 305/24; 305/33; 305/31; 359/131
(58) Field of Search ........................... 385/34, 31, 33, 385/47, 17, 59, 61, 24; 359/127, 131

(56) References Cited

U.S. PATENT DOCUMENTS

| | | | | |
|---|---|---|---|---|
| 4,198,117 | * | 4/1980 | Kobayashi | 385/37 |
| 4,304,460 | * | 12/1981 | Tanaka et al. | 385/22 |
| 4,511,208 | * | 4/1985 | Ozeki et al. | 385/24 |
| 4,550,975 | * | 11/1985 | Levinson et al. | 385/34 |
| 4,926,412 | * | 5/1990 | Jannson et al. | 359/130 |
| 5,815,621 | * | 9/1998 | Sakai et al. | 385/80 |
| 5,845,023 | * | 12/1998 | Lee | 385/33 |

* cited by examiner

Primary Examiner—Hemang Sanghavi
Assistant Examiner—Sung H. Pak
(74) Attorney, Agent, or Firm—Neil Teitelbaum

(57) ABSTRACT

1. A lensed sleeve has a holder having at least two substantially parallel rows of optical fibers which are offset from one another by about 2 $\mu$m or more. Generally these defective offset sleeves have to be discarded as their offset inhibits proper coupling of light, however in accordance with this invention a lens is disposed to receive light from at least optical fibers within one of the at least two rows of optical fibers. By using symmetry about the lens, light can be efficiently coupled between particular fibre ends on the offset rows. Advantageously, this invention provides a use for otherwise useless sleeves which did not meet intended tolerances.

13 Claims, 3 Drawing Sheets

LENSED SLEEVE

FIELD OF THE INVENTION

This invention relates to optical fibre sleeves used for example, as connector ferrules and for use in this invention with a lens as a coupler.

BACKGROUND OF THE INVENTION

In fibre based optical systems, signals propagate within optical fibers. When optically coupling two components, a fiber is coupled at a first end to a first component and at a second end to a second component. Often in an optical system, a plurality of fibers is routed within the system. When a large number of fibers are used, designs often incorporate ribbon fibers comprising a number of fibers and having a single connector at each end. The single multi-fibre connector is provided with bores or v-grooves for accepting optical fibers. Into each bore, a fiber is inserted and held in place.

Small irregularities or non-accuracies in ferrule and fiber manufacture can result in significant signal loss, particularly in coupling single mode fibers. A standard ferrule has an internal diameter closely matching a fiber diameter.

At times it is noted that different fibers within a cable have alignment errors; in this instance, it is nearly impossible to find two connectors that couple efficiently for all fibre pairs.

For more efficient installation of ribbon fibers, the coupling of multiple fiber ends at a single multi-fibre-connector pair, heretofore, has not been satisfactory. U.S. Pat. No. 5,671,311 to Stille et al. discloses a method of aligning a number of receiving ferrules within a less precise housing by providing aligning pins for locating the ferrule bores in the housing. Once the ferrules are positioned the fibers are then inserted. This is a rather imprecise method, which does not provide an opportunity to correct transmission problems once the fibers and light sources are in place. Also, since the fiber is inserted after the tuning is performed, slack between the ferule and the fiber can be a significant problem.

As of late, optical fibre sleeves have been manufactured with openings therein for accommodating optical fibers in two or more parallel rows. In this arrangement, the fibers are very closely spaced but preferably are not touching. The purpose of providing some space between adjacent optical fibers is to overcome the limitation of having adjacent fibers touch when the fibers' outer diameters vary from one another. Hence, providing accurately spaced holes within a sleeve offers an advantage.

In one instance, these sleeves are used as connector ends where the two or more parallel rows of one sleeve are used to couple with rows of optical fibers of a mating connector. Alternatively, a single-row or multi-row sleeve can be used as an optical fibre sleeve for coupling with another optical component such as an optical waveguide block, having waveguides disposed at an end thereof for coupling with the optical fibre ends within the single or multi-row sleeve. Within the specification the term sleeve shall not be confined to cylindrical sleeve and shall include other shapes such as a sleeve having a square or rectangular cross-section.

Within each row of the two parallel rows these sleeves or connector ends can be manufactured with substantially accurately spaced holes or grooves, however it is difficult to consistently align row holes and subsequently optical fibers within the two rows such that fibre 1 in row 1 is aligned with fibre 1 in row 2, fibre 2 in row 1 is aligned with fibre 2 in row 2, and so on. In other words, it is difficult to ensure that there is no lateral shift between the two rows of a same sleeve. It is also difficult to manufacture two parallel rows with a tight tolerance space, for example with $\mu$m precision between the rows.

Currently, when an optical sleeve housing optical fibers in substantially parallel rows is found to have parallel rows of fibers wherein the rows are laterally offset more than a predetermined amount from one another, (about of 2 $\mu$m) the sleeve is said to be outside acceptable tolerance for single mode optical fibre alignment and the sleeve is discarded.

An object of this invention is to provide a use for such sleeves that have parallel rows that are laterally offset and outside acceptable tolerances.

A further object of the invention is to provide a coupling device having a lens and a sleeve with parallel rows of optical waveguides that are laterally offset from one another.

SUMMARY OF THE INVENTION

In accordance with this invention, there is provided an optical device comprising a holder having, at least two substantially parallel rows of optical fibers contained therein the at least two rows being laterally offset from one another by about 2 $\mu$m or more, and a lens having an optical axis, the lens being disposed to receive light from at least optical fibers within one of the at least two rows.

In accordance with this invention, an optical device is provided, comprising a holder having at least two substantially parallel rows of optical fibers contained therein the at least two rows being spaced apart and being laterally offset from one another by at least 3 $\mu$m and a lens having an optical axis, the lens being disposed to receive light from at least optical fibers within one of the at least two rows, the optical fibers in each of the rows having a core and a cladding, adjacent cores in a row being separated from an adjacent core by a predetermined distance, the variance of the distance between adjacent cores being less than 2 $\mu$m.

BRIEF DESCRIPTION OF THE DRAWINGS

Exemplary embodiments of the invention will now be described in conjunction with the drawings in which:

FIG. 1b is an end view of the sleeve shown in FIG. 1a;

FIG. 3b is an end view of the optical sleeve shown in FIG. 3a, as seen from line B—B of FIG. 3a.

DETAILED DESCRIPTION

Figure 1A:
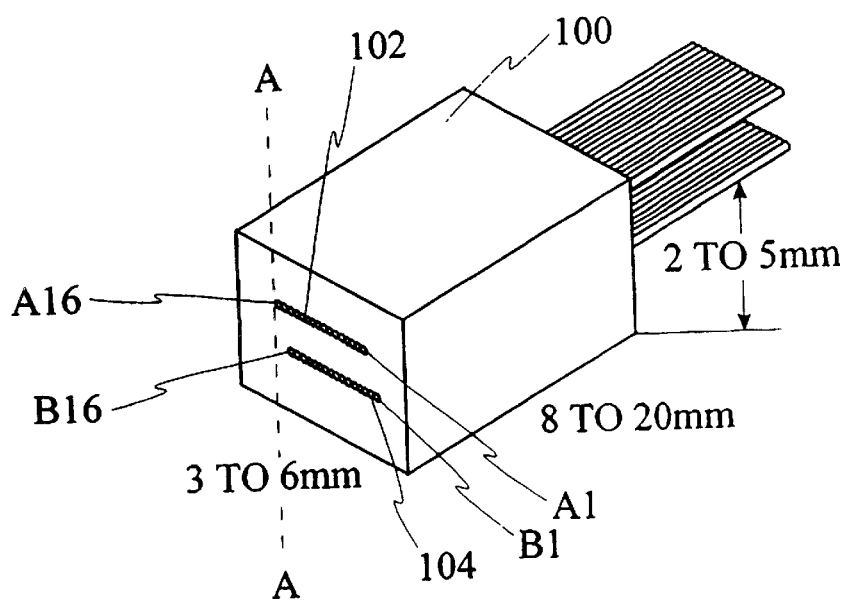
FIG. 1a is an oblique view of a sleeve end having two laterally offset rows.
Figure 1B:
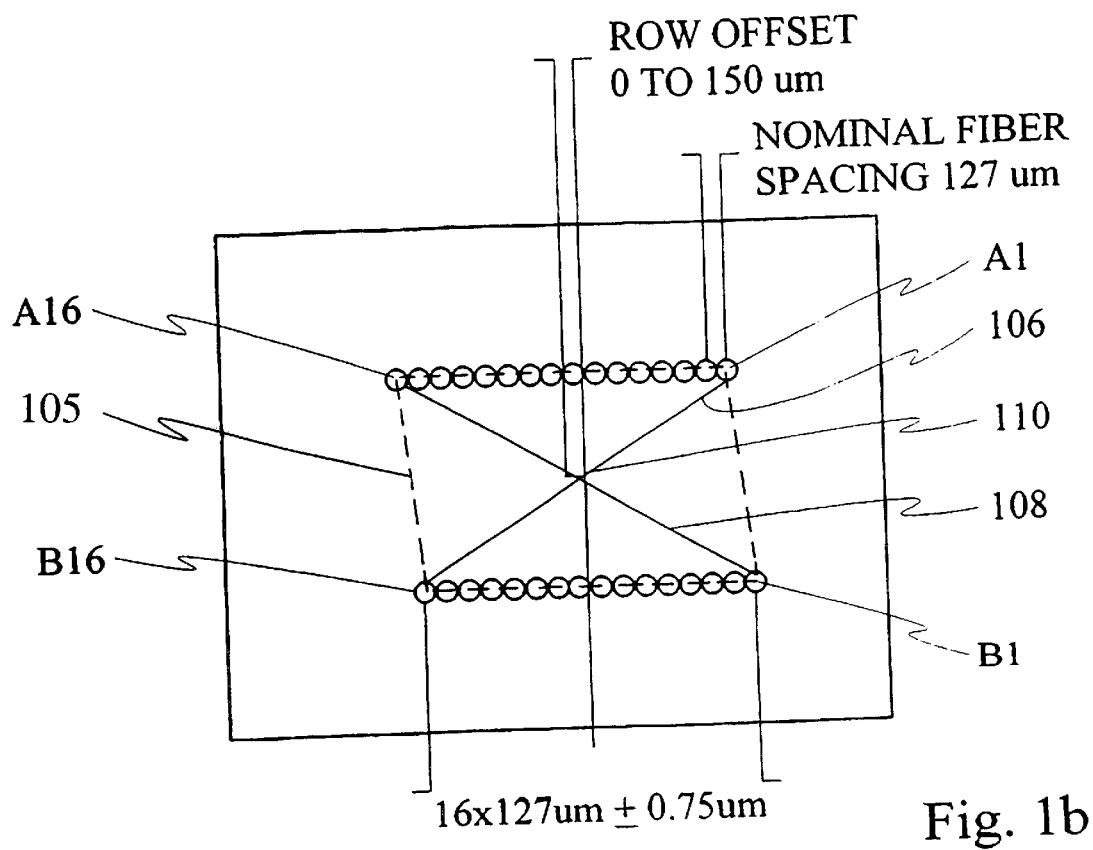

Referring now to FIGS. 1a and 1b an optical sleeve 100, having an intended use as a connector end or coupling end is shown having a first row 102 of 16 optical fibre ends A1, through A16 arranged in a straight line having their end faces coplanar with the end face of the sleeve 100. Optical fibre end A16 is coincident with an imaginary line A—A shown for the purpose of illustration. A second row 104 of 16 optical fibre ends B1 through B16 is arranged in a straight line parallel with the first row of optical fibers. Instead of the end most optical fibre B16 in the second row being disposed along the line A—A as is optical fibre end A16, B16 is offset due to misalignment in the manufacturing process. As shown in FIG. 1b, the axes of the fiber ends form a parallelogram 105 having a center 110 define by the intersection of lines 106 and 108 which join opposite corners of the parallelogram. Until now, a sleeve such as this would be discarded, and considered useless for its intended purpose of coupling to another sleeve or to a waveguide array.

Notwithstanding, this invention provides a use and device for efficiently coupling light that can make use of such otherwise discardable sleeves having laterally offset rows of optical fibers.

Figure 2A:
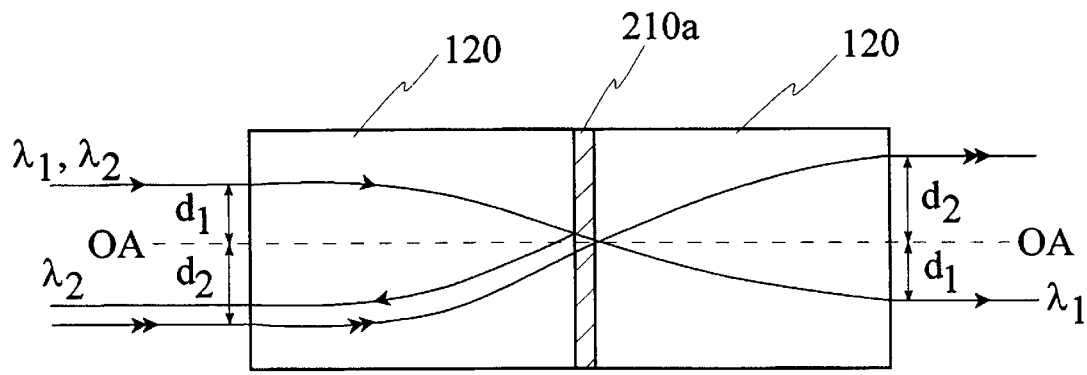
FIG. 2a is a side view of a prior art optical filter.

Prior art FIG. 2a is shown to illustrate properties of a quarter pitch GRIN lens which is used in a preferred embodiment of this invention. In FIG. 2a a pair of graded index (GRIN) lenses 120 are shown arranged back-to-back having a commom axis and having a multi-layer dichroic filter element 210a disposed therebetween. The filter element is designed to pass light of wavelength $\lambda 1$ and reflect light of wavelength $\lambda 2$. The input light beam enters at a distance $d_1$ from the optical axis of the lens and part of it passes through the lenses to exit the same distance $d_1$ from the lens axis, while another part is reflected by the filter and passes out of the input end. The GRIN lens used is a lens such as ones produced under the trade name "SELFOC"; the mark is registered in Japan and owned by the Nippon Sheet and Glass Co. Ltd.

Figure 2B:
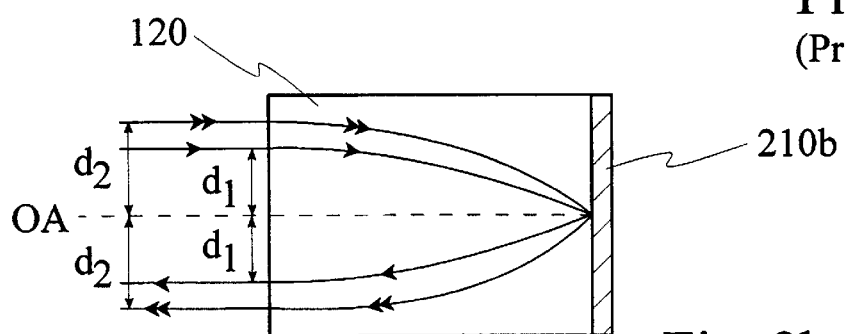
FIG. 2b is a side view of a prior art GRIN lens having a reflective end.

FIG. 2b shows a quarter pitch collimating/focusing GRIN lens 120 and mirror 210b at an end of the quarter pitch lens 120 which is designed to reflect light incident upon it via symmetry about the optical axis of the lens to a location equidistant from where the light was launched from the optical axis. For example, light entering the lens at distance $d_1$ and $d_2$ from the axis will exit the lens at these same distances from the axis. The purpose of FIG. 2b is to illustrate that light launched into the input end at the left of the lens a distance d from the optical axis is reflected by the mirror 210b to a different location a same distance d from the optical axis of the lens.

Figure 2C:
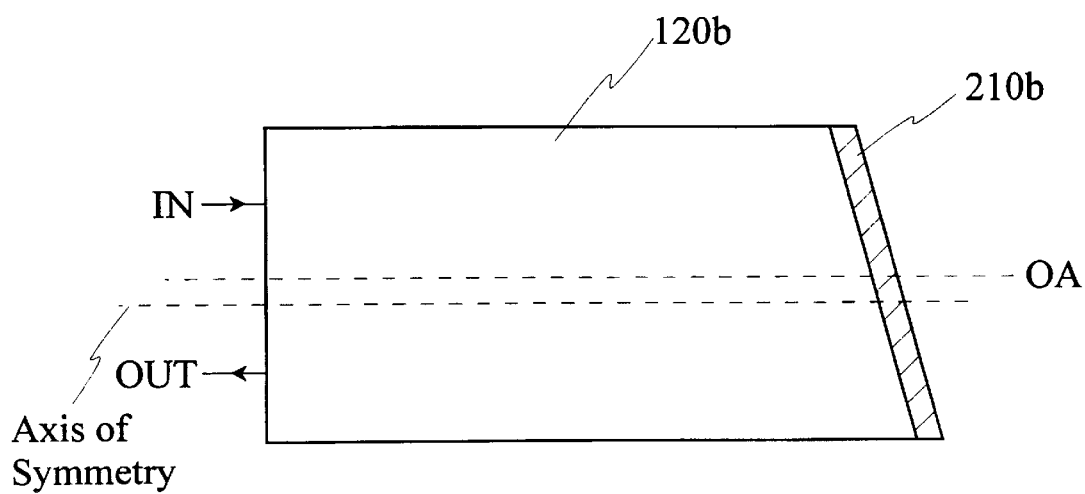
FIG. 2c is a side view of a prior art GRIN lens having a slanted reflective end.

FIG. 2c shows a GRIN lens filter arrangement wherein symmetry about an axis parallel to and offset from the optical axis OA through the GRIN 120b lens provides coupling from one row to a parallel but laterally offset row of optical fibers. In this instance, since an end face of the lens is slanted, reflection is achieved from a reflective surface 210b, however an axis offset from the optical axis of the lens provides symmetry.

Figure 3A:
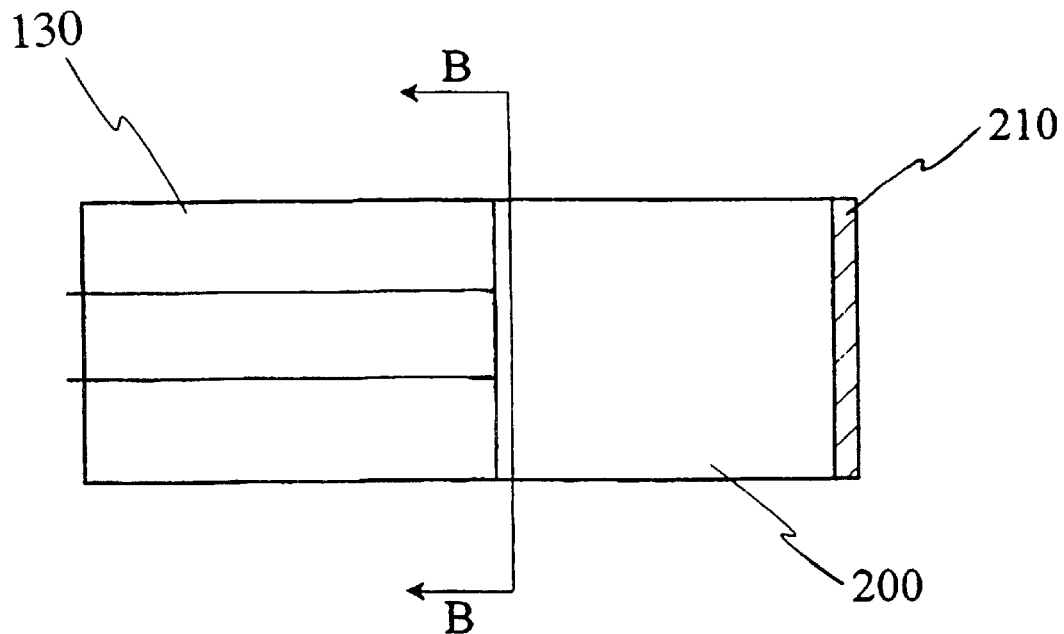
FIG. 3a is side view of an optical sleeve coupled with a GRIN lens in accordance with this invention.
Figure 3B:
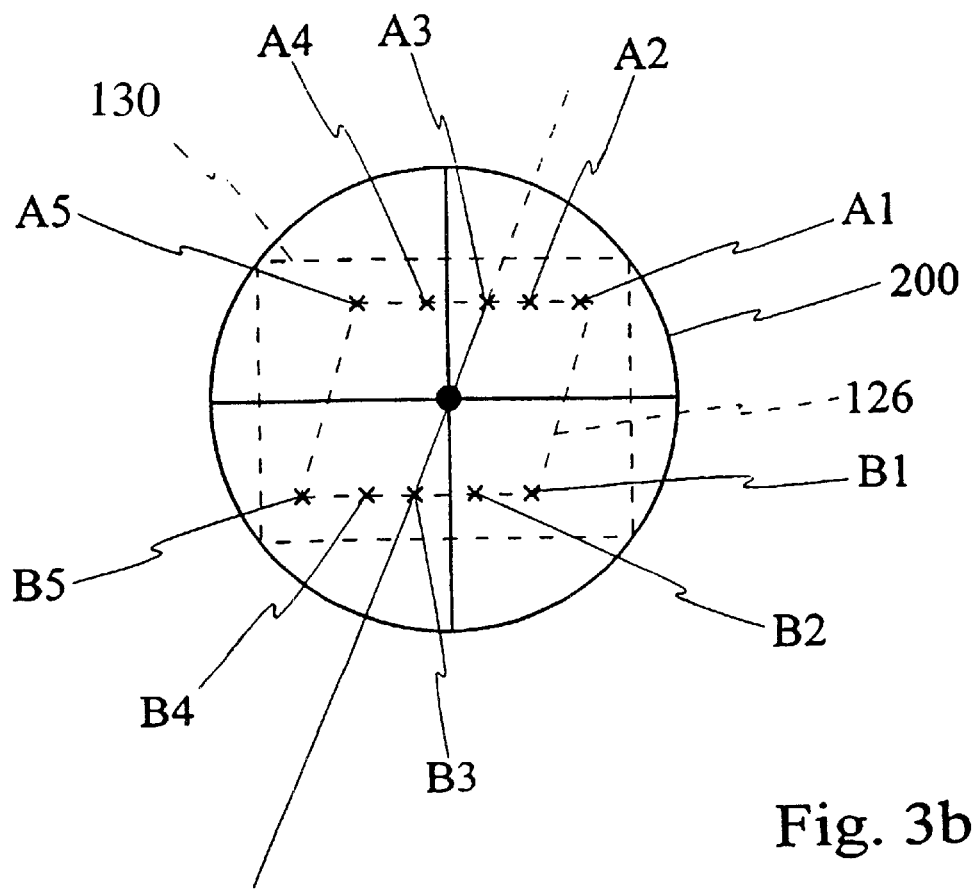

Turning now to FIGS. 3a and 3b an optical system in accordance with the invention is shown, wherein an optical fibre sleeve 130 has two parallel rows A1 to A5 and B1 to B5 of 5 spaced optical fibers laterally offset. Prior to this invention, such flawed sleeves having a substantial lateral offset that would otherwise seriously affect the coupling of light, their intended purpose, were discarded. However, the arrangement of elements in FIG. 3a provides a use for such flawed sleeves, which previously had no use as or in an optical component. Since offset parallel rows of fiber ends form a parallelogram 126 about the optical axis OA as is shown if FIG. 3b, ports along one row can be paired with ports in a parallel row through use of a lens. In fact a line can be drawn between any pair of corresponding ports which intersects the optical axis OA such as the line shown through ports B3 and A3. In FIG. 3a, adjacent the optical fibre sleeve 130 is a graded index (GRIN) lens 200. At an end location of the GRIN lens, indicated as 0.25 pitch, an input beam becomes collimated. An optical element or coating 210 in the form of a multilayer filter or alternatively a mirror is disposed about the end of the lens or coated directly onto the end of the lens 200. When two quarter pitch GRIN lenses are disposed end to end, such that light couples from one lens to the other, light launched at an off axis location, into one end, exits an end of the second lens a same distance from the optical axis of the lens, but at an opposite side of the optical axis. Similarly, light launched into the lens 200 at an off axis location, for example if light is input into optical fibre Al and propagates through the lens and is reflected backwards, the light will couple into optical fibre B5. As well light launched into optical fibre B3 will couple via reflection to a port or fibre A3 an equal distance from the optical axis but at an opposite side of the optical axis. This symmetry indicated by the parallelogram 126 shown in dotted outline allows coupling of light from fibre ends A1 to B5, A2 to B4, A3 to B3, A4 to B2, and A5 to B1 and vice versa. It will be noted that the parallelogram 126 has its adjacent sides non-perpendicular to each other, i.e. it is non-rectangular, and that there are no optical fiber ends outside this parallelogram.

This invention is not restricted to having an entire row being used to transmit light while an adjacent row to which it is coupled be used to receive light. The coupling can be such that particular waveguides can be used to transmit, while others on a same row may be used to receive light from a corresponding waveguide to which it is coupled.For example, at least a further row of optical fibers may be disposed at an opposite end of the lens from that adjacent the parallel rows, and optical fibers within said further row may be positioned to receive or transmit light from or to optical fibers of the two parallel rows. In this case, a filter may be disposed between the two parallel rows of optical fibers and the lens.

Numerous other embodiments may be envisaged, without departing from the spirit and scope of the invention.

What is claimed is:

1. An optical device comprising a holder having at least two substantially parallel rows of at least 3 optical fibers, the at least two rows of optical fibers being laterally offset from one another by about 2 $\mu$m or more and such that two lines across an end face of the at least two substantially parallel laterally offset rows of optical fibers and two imaginary straight lines joining closest endpoints of the offset rows form a parallelogram, and a lens having an optical axis which is coincident with a center of the parallelogram, the lens being disposed to receive light from at least optical fibers within one of the at least two rows of optical fibers.

2. An optical device as defined in claim 1 wherein the lens is a GRIN lens which is adjacent to said rows of optical fibers.

3. An optical device as defined in claim 1, wherein each of the parallel rows of optical fibers are comprised of a plurality of optical fibers disposed so that they are not touching an adjacent optical fibre within a same row.

4. An optical device as defined in claim 1, wherein the lens is disposed to receive light from at least one of the optical fibers in one of the at least two rows and for transmitting at least some of said light via reflection to one of the optical fibers in another of the at least two rows.

5. An optical device as defined in claim 1, wherein the lens is disposed to receive light from at least one of the optical fibers in one of the at least two rows and for transmitting at least some of said light to one or more other optical fibers.

6. An optical device as defined in claim 4, wherein the rows are laterally offset from one another by more than 2 $\mu$m.

7. An optical device as defined in claim 1, wherein each of the parallel rows of optical fibers are comprised of a plurality of optical fibers disposed so that cores of adjacent optical fibers are substantially a same distance apart.

8. An optical device as defined in claim 1, wherein each of the optical fibers in one of the at least two substantially parallel rows is coupled with another of the optical fibers in said another row.

9. An optical device according to claim 1, further comprising at least a further row of optical fibers disposed at an opposite end of the lens from the at least two parallel rows, optical fibers within said further row being positioned to receive or transmit light from or to optical fibers of the at least two substantially parallel rows.

10. An optical device as defined in claim 9 further comprising a filter disposed between the at least two parallel rows of optical fibers and the lens.

11. An optical device according to claim 1, wherein said parallelogram is non-rectangular, and wherein the holder has no optical fiber ends outside of said parallelogram.

12. An optical device comprising a holder having, at least two substantially parallel rows of optical fibers contained therein the at least two rows each having at least 4 optical fibers and being spaced apart and being laterally offset from one another by at least 3 $\mu$m and a lens having an optical axis, the lens being disposed to receive light from at least optical fibers within one of the at least two rows, the optical fibers in each of the rows having a core and a cladding, adjacent cores in a row being separated from an adjacent core by a predetermined distance, the variance of the distance between adjacent cores being less than 2 $\mu$m.

13. An optical device according to claim 12, wherein said parallelogram is non-rectangular, and wherein the holder has no optical fiber ends outside of said parallelogram.

* * * * *